(12) United States Patent
Nelakonda et al.

(10) Patent No.: US 8,731,153 B2
(45) Date of Patent: May 20, 2014

(54) TELEPHONE NUMBER RESOURCE MANAGER USER INTERFACE AND FEATURE CONTROL

(75) Inventors: Bharath Nelakonda, Leesburg, VA (US); Javier Sebastian Rizzo, Buenos Aires (AR); Stephen P. Hetey, Leesburg, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 316 days.

(21) Appl. No.: 13/342,012

(22) Filed: Dec. 31, 2011

(65) Prior Publication Data

US 2013/0170633 A1 Jul. 4, 2013

(51) Int. Cl.
*H04M 11/00* (2006.01)

(52) U.S. Cl.
CPC .................................. *H04M 11/00* (2013.01)
USPC ................ 379/93.23; 379/90.01; 379/201.01; 379/220.01

(58) Field of Classification Search
USPC ................ 379/93.23, 90.01, 201.01, 221.01, 379/127.01, 220.01, 221.56, 221.13
See application file for complete search history.

(56) References Cited

U.S. PATENT DOCUMENTS 5,533,107 A * 7/1996 Irwin et al. ................ 379/201.01
8,265,257 B2 * 9/2012 Schultz ..................... 379/220.01

* cited by examiner

*Primary Examiner* — Melur Ramakrishnaiah

(57) ABSTRACT

A method may include storing a database including a plurality of subscriber identifiers, wherein each subscriber identifier is associated with a telephone number and a subscriber name and address. Each subscriber identifier may be unique to the corresponding subscriber name and address. The method may include storing a database including a plurality of customer identifiers. Each customer identifier may be associated with one of the subscriber identifier and a customer name and address. The method may further include receiving an update to the subscriber name or address associated with one of the telephone numbers and associating a new subscriber identifier with the updated subscriber name or address. The method may further include associating the new subscriber identifier with one of the customer identifiers.

20 Claims, 15 Drawing Sheets

TELEPHONE NUMBER TABLE 302-1

| TELEPHONE NO. 402 | STATUS 404 | SUBSCRIBER ID 408 | HISTORY 410 |
|---|---|---|---|
| 2018917239 | GRANTED | 58625 | GRANTED 2011-09-01 |
| 2018917240 | GRANTED | 58625 | GRANTED 2011-09-01 |
| 2018917241 | GRANTED | 58626 | GRANTED 2011-09-01 |
| 2018917242 | GRANTED | 58626 | GRANTED 2011-09-01 |
| 2018917243 | GRANTED | 58625 | GRANTED 2011-09-01 |
| 2018917244 | GRANTED | - | GRANTED 2011-09-01 |
| 2018917245 | GRANTED | - | GRANTED 2011-09-01 |
| 2018917246 | GRANTED | 58625 | GRANTED 2011-09-01 |
| 2018917247 | GRANTED | - | GRANTED 2011-09-01 |

TELEPHONE NUMBER TABLE 302-2

| TELEPHONE NO. 402 | STATUS 404 | SUBSCRIBER ID 408 | HISTORY 410 |
|---|---|---|---|
| 2018917239 | GRANTED | 58625 | GRANTED 2011-09-01 |
| 2018917240 | GRANTED | 58628 | GRANTED 2011-09-01 |
| 2018917241 | GRANTED | 58626 | GRANTED 2011-09-01 |
| 2018917242 | GRANTED | 58626 | GRANTED 2011-09-01 |
| 2018917243 | GRANTED | 58625 | GRANTED 2011-09-01 |
| 2018917244 | GRANTED | - | GRANTED 2011-09-01 |
| 2018917245 | GRANTED | - | GRANTED 2011-09-01 |
| 2018917246 | GRANTED | 58625 | GRANTED 2011-09-01 |
| 2018917247 | GRANTED | - | GRANTED 2011-09-01 |

452-1, 452-2, 452-3, 452-4, 452-5, 452-6, 452-7, 452-8, 452-9

| SUBSCRIBER TABLE 304-1 | | | |
|---|---|---|---|
| SUBSCRIBER ID 502 | SUBSCRIBER NAME 504 | SUBSCRIBER ADDRESS 506 | SUBSCRIBER TYPE 508 |
| 58625 | CBA INC. | 763 MAIN STREET, MUNICH, DE 52541 | BUSINESS |
| 58626 | FDE INC. | 876 MAIN STREET, MUNICH, GERMANY 52541 | BUSINESS |
| 58627 | GHI INC. | 935 MAIN STREET, MUNICH, GERMANY 52542 | BUSINESS |

| SUBSCRIBER TABLE 304-2 | | | |
|---|---|---|---|
| SUBSCRIBER ID 502 | SUBSCRIBER NAME 504 | SUBSCRIBER ADDRESS 506 | SUBSCRIBER TYPE 508 |
| 58625 | CBA INC. | 763 MAIN STREET, MUNICH, GERMANY 52541 | BUSINESS |
| 58626 | FDE INC. | 876 MAIN STREET, MUNICH, GERMANY 52541 | BUSINESS |
| 58627 | GHI INC. | 935 MAIN STREET, MUNICH, GERMANY 52542 | BUSINESS |
| 58628 | CBA INC. | 760 FIRST STREET, MUNICH, GERMANY 52541 | BUSINESS |

CUSTOMER TABLE 306-1

| CUSTOMER ID 602 | CUSTOMER NAME 604 | CUSTOMER ADDRESS 606 | SUBSCRIBER ID 608 |
|---|---|---|---|
| 2685 | CBA INC. | 763 MAIN STREET, MUNICH, GERMANY 52541 | 58625 |
| 2686 | FDE INC. | 876 MAIN STREET, MUNICH, GERMANY 52541 | 58626 |
| 2687 | GHI INC. | 935 MAIN STREET, MUNICH, GERMANY 52542 | 58627 |

652-1 → (row 1)
652-2 → (row 2)
652-3 → (row 3)

CUSTOMER TABLE 306-2

| CUSTOMER ID 602 | CUSTOMER NAME 604 | CUSTOMER ADDRESS 606 | SUBSCRIBER ID 608 |
|---|---|---|---|
| 2685 | CBA INC. | 763 MAIN STREET, MUNICH, GERMANY 52541 | 58625, 58628 |
| 2686 | FDE INC. | 876 MAIN STREET, MUNICH, GERMANY 52541 | 58626 |
| 2687 | GHI INC. | 935 MAIN STREET, MUNICH, GERMANY 52542 | 58627 |

| OPERATOR TABLE 308 | | |
|---|---|---|
| USER ID 702 | COUNTRY 704 | ROLE 706 |
| ROGER | FRANCE, GERMANY, UNITED STATES | NUMBER ADMIN |
| MARY | SPAIN, FRANCE | NUMBER OPERATOR |
| JOHN | GERMANY | SEARCHER |
| SUE | SPAIN, FRANCE | NUMBER ADMIN, NUMBER OPERATOR, SEARCHER |

| ROLE TABLE 310 | |
|---|---|
| ROLE 802 | FEATURES 804 |
| NUMBER ADMIN | ADD BLOCK, EDIT BLOCK, CANCEL BLOCK, SEARCH BLOCK, ALLOCATE, DE-ALLOCATE, ADD RESERVATION, EDIT RESERVATION, CANCEL RESERVATION, SEARCH RESERVATIONS, ADD SUBSCRIBER, SEARCH SUBSCRIBER, CANCEL SUBSCRIBER, EDIT SUBSCRIBER, ADD CUSTOMER, SEARCH CUSTOMER, CANCEL CUSTOMER, EDIT CUSTOMER, EDIT TN INFO |
| NUMBER OPERATOR | ALLOCATE, DE-ALLOCATE, ADD RESERVATION, EDIT RESERVATION, CANCEL RESERVATION, SEARCH RESERVATIONS, ADD SUBSCRIBER, SEARCH SUBSCRIBER, CANCEL SUBSCRIBER, EDIT SUBSCRIBER, ADD CUSTOMER, SEARCH CUSTOMER, CANCEL CUSTOMER, EDIT CUSTOMER, EDIT TN INFO |
| SEARCHER | SEARCH BLOCK, SEARCH CUSTOMER, SEARCH RESERVATIONS, SEARCH SUBSCRIBER |

FIG. 8

TELEPHONE NUMBER RESOURCE MANAGER USER INTERFACE AND FEATURE CONTROL

BACKGROUND INFORMATION

In some instances, network providers sell telephone service directly to end users or subscribers. In other instances, a network provider may provide a group or block of numbers to a wholesaler who then sells the network services to end users or subscribers. In this latter instance, the wholesaler has a direct relationship with the subscriber. The network provider may also have a relationship with the subscriber, as the network provider may know information about the subscriber in order to provide the services.

BRIEF DESCRIPTION OF THE DRAWINGS

FIGS. 4A and 4B are diagrams of exemplary telephone number tables stored in the controller of FIG. 3B;

FIGS. 5A and 5B are diagrams of exemplary subscriber tables stored in the controller of FIG. 3B;

FIGS. 6A and 6B are diagrams of exemplary customer tables stored in the controller of FIG. 3B;

FIG. 8 is a diagram of an exemplary role table stored in the controller of FIG. 3B;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

As mentioned above, in some instances, a network provider may provide a group or block of numbers to a wholesaler who then sells the network services to the end user or subscriber. In this instance, the wholesaler has a direct relationship with the subscriber. The network provider may also have a relationship with the subscriber, as the network provider may know information about the subscriber in order to provide the services. Embodiments described herein allow for the network provider to track many different subscribers as a single customer. Such tracking of subscribers allows for the network provider to serve the customer better.

Figure 1:
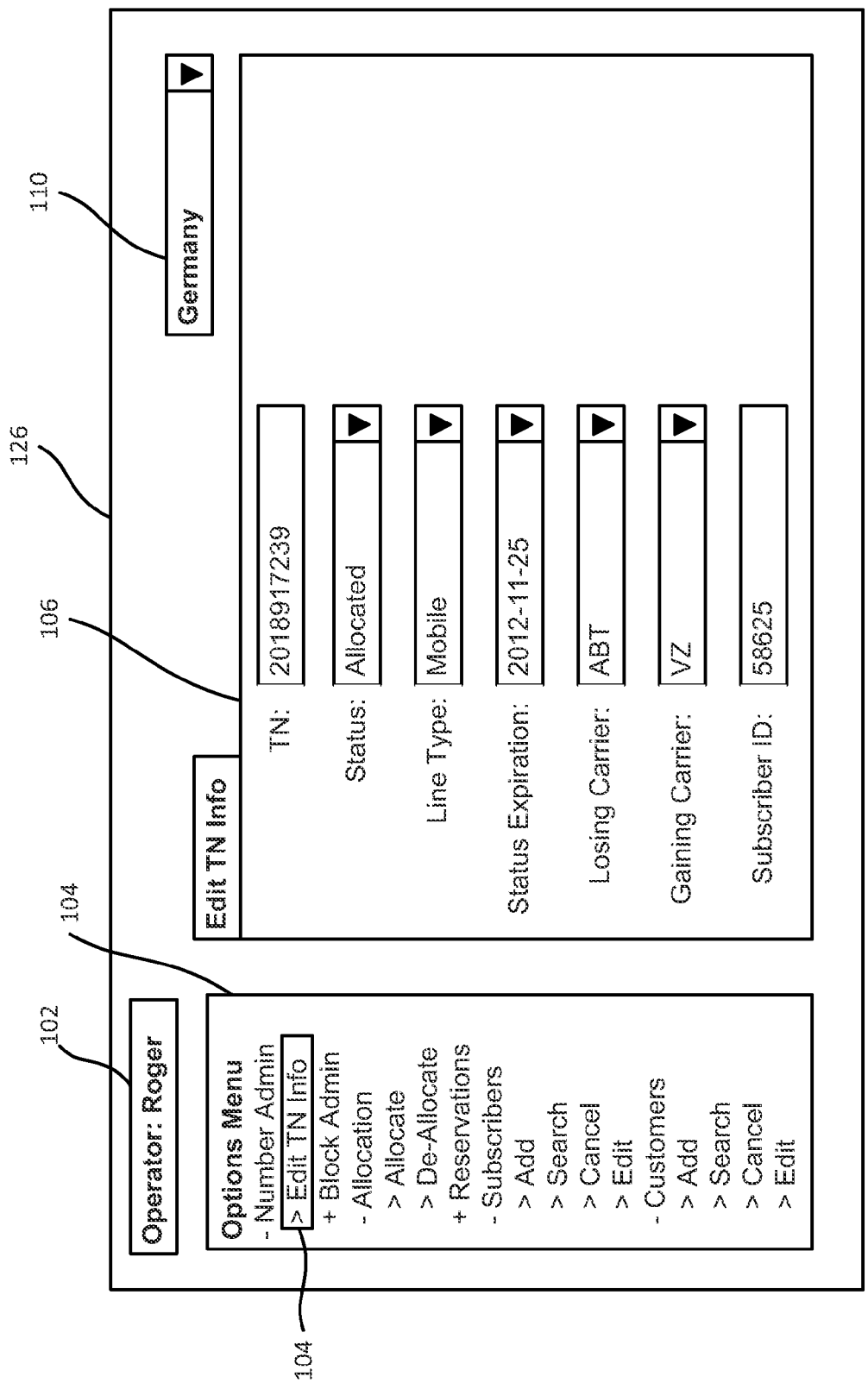
FIG. 1 is a diagram of an exemplary user interface according to one embodiment.

Embodiments described herein also allow for the network provider to display a menu of options that provide an operator (e.g., a person who manages a telephone number resource system) with features. The features displayed may be limited to those features for which the operator has privileges. The features displayed may also be limited to those features associated with countries in which the operator is allowed to operate. For example, as shown in FIG. 1, an operator named Roger (as identified in a dialog box 102) is presented with a menu 104 of options on a display 126, including the highlighted option of "Edit TN Info." The menu 104 of options may be determined by the selected country (e.g., Germany) and the privileges or roles associated with the operator Roger.

Figure 2:
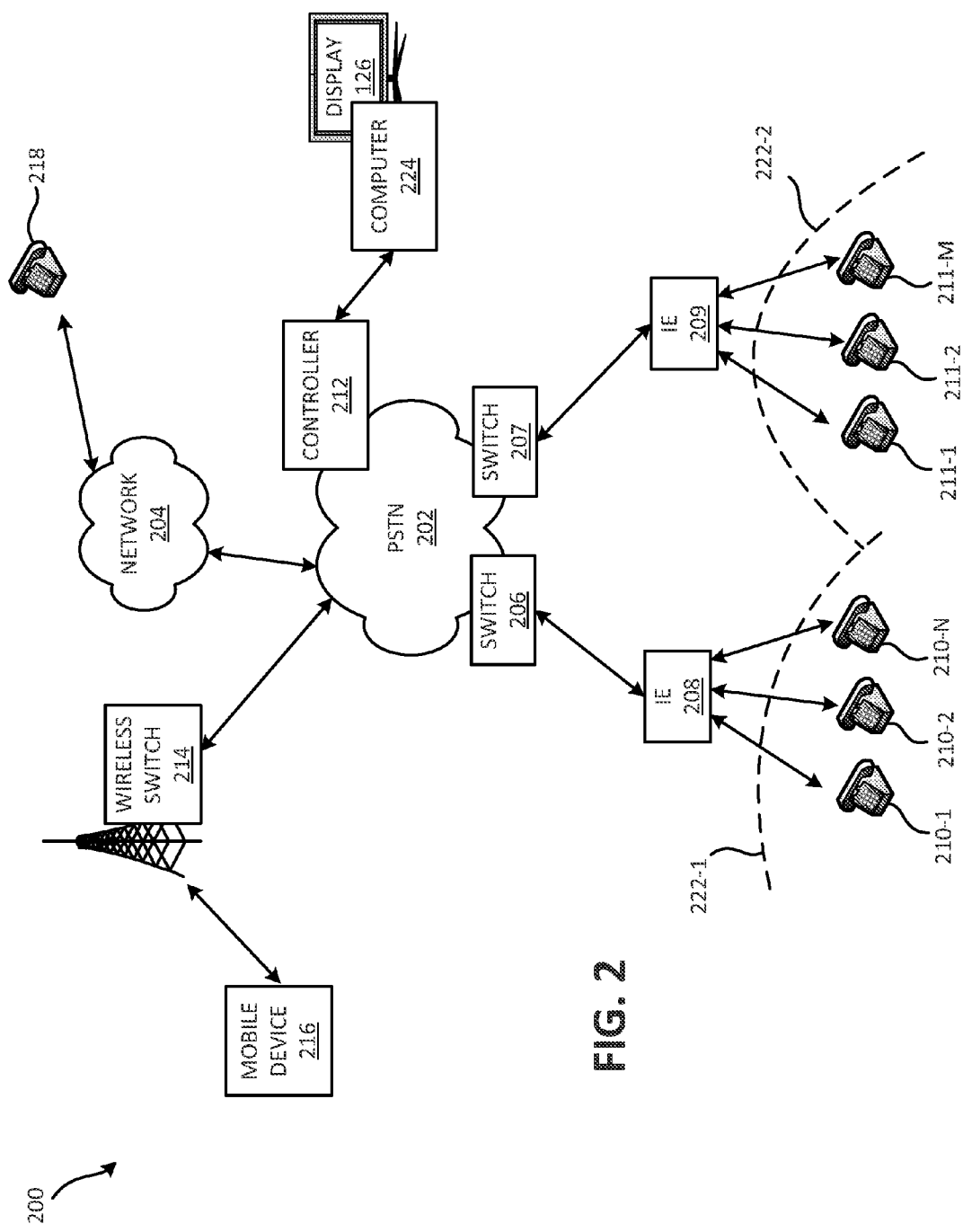
FIG. 2 is a block diagram of an exemplary network for implementing embodiments described herein.

FIG. 2 is a block diagram of an exemplary network 200 for implementing embodiments described herein. Network 200 may include a public switch telephone network (PSTN) 202, a network 204, switches 206 and 207, intermediary equipment (IE) 208 and 209, telephones 210-1 through 210-N (collectively phones 210, individually phone 210-x), telephones 211-1 through 211-M (collectively phones 211), a controller 212, a wireless switch 214, a mobile device 216, a telephone 218, a computer 224, and display 126.

Phones 210 may be associated with a first customer premises 222-1 and a PBX or Centrex group assigned to a first block of telephone numbers (TNs). Phones 210 may include any type of residential, business, and/or mobile phone that may be connected to PSTN 202 through intermediary equipment 208 and switch 206. In one embodiment, phones 210 may each be associated with one or more TNs in the block of TNs associated with the PBX or Centrex group associated with customer premises 222-1.

Intermediary equipment 208 may include a telephone network box, telephone poles, an entrance bridge, a digital concentrator, fiber-optic cables, digital equipment, etc. Switch 206 may include a class 5 telephone switch, such as a 5ESS switch made by Alcatel-Lucent. Controller 212 may provide administration and management of switch 206. Switch 206 may include switching modules to switch signals (e.g., telephone calls) by interpreting dialed digits and connecting calls between telephones, for example.

Controller 212 may define groups or blocks of TNs to assign to subscribers (e.g., in PBXs and/or Centrex groups). Controller 212 may also associate different subscribers to a single customer. Thus, should one customer be associated with multiple subscribers, the network provider (e.g., an operator working at the network provider) may keep track of such associations. Computer 224 may be coupled to display 126. Computer 224 may allow an operator to access and edit information stored in controller 212, such as information about TNs, subscribers, and customers. Controller 212 in combination with computer 224 and display 126 may allow the operator to view a menu of options, such as the menu of options shown in FIG. 1.

Wireless switch 214 may control traffic and signaling with a mobile device (e.g., mobile device 216). Wireless switch 214 may include an antenna to transmit and receive signals to and from mobile device 216. Mobile device 216 may include a mobile phone, a tablet computer, a laptop, or another portable communication device. Even though mobile device 216 is not in customer premises 222-1, it may still be associated with the same PBX or Centrex group as phones 210, for example.

Network 204 may include one or more packet switched networks, such as an Internet protocol (IP) based network, a local area network (LAN), a wide area network (WAN), a personal area network (PAN), an intranet, the Internet, or another type of network that is capable of transmitting data. Network 204 may also include a circuit-switched network, such as a PSTN (similar to PSTN 202) for providing telephone services for traditional telephones. Phone 218 may be coupled to network 204 and may use a packet-based protocol for establishing calls and transmitting media (e.g., session initiation protocol (SIP) and/or real-time protocol (RTP)). While phone 218 may not be physically located at customer premises 222-1, phone 218 may be associated with the same PBX or Centrex group as phones 210, for example.

Phones 211 may be associated with a second customer premises 222-2 and a PBX or Centrex group assigned to a second block of TNs different than the block of TNs associated with first customer premises 222-1. Phones 211 may be connected to PSTN 202 through intermediary equipment 209 and switch 207. In one embodiment, phones 211 may each be associated with one or more TNs in the block of TNs associated with the PBX or Centrex group associated with second customer premises 222-2. Phones 211, intermediary equipment 209, and switch 207 may be configured and operate similarly to phones 210, intermediary equipment 208, and switch 206 discussed above.

The exemplary configuration of devices in network 200 is illustrated for simplicity. Network 200 may include more devices, fewer devices, or a different configuration of devices than illustrated in FIG. 1. For example, network 200 may include thousands or millions of customer premises, each associated with a PBX or Centrex group and telephones. In some embodiments, the functions performed by two or more devices may be performed by any one device. Likewise, in some embodiments, the functions performed by any one device may be performed by multiple devices. Further, the connections shown in FIG. 1 are exemplary. In other embodiments, additional connections that are not shown in FIG. 1 may exist between devices (e.g., each device may be connected to every other device).

Figure 3A:
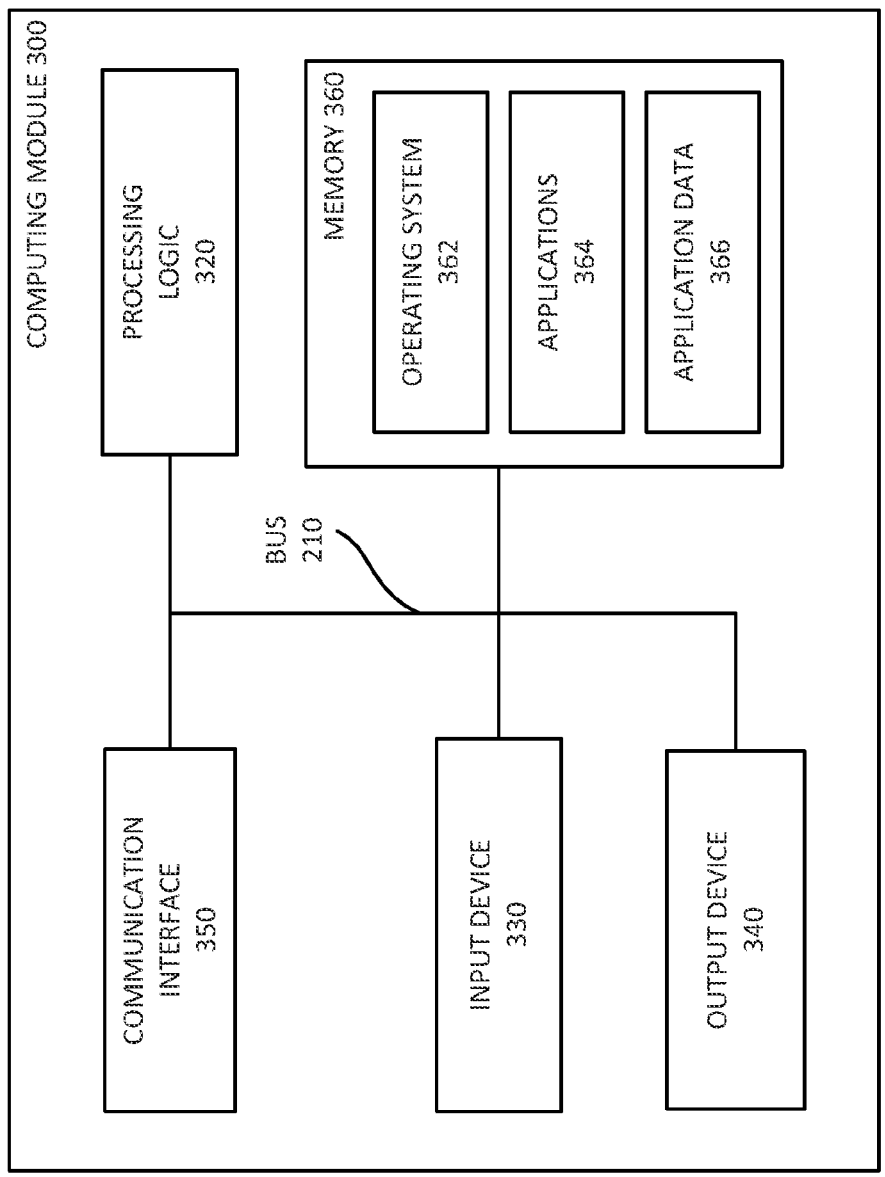
FIG. 3A is a block diagram of exemplary components of a computing module.

Devices in network 200 may include one or more computing modules. FIG. 3A is a block diagram of exemplary components of a computing module 300. Computing module 300 may include a bus 310, processing logic 220, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 includes a path that permits communication among the components of computing module 300. Processing logic 220 may include any type of processor or microprocessor (or families of processors or microprocessors) that interprets and executes instructions. In other embodiments, processing logic 220 may include an application-specific integrated circuit (ASIC), a field-programmable gate array (FPGA), etc.

Input device 330 may allow computing module 300 to input information (e.g., from an operator or user) into computing module 300. Input device 330 may include a keyboard, a mouse, a pen, a microphone, a remote control, a touchscreen display, etc. Some devices, such as switch 206, may be managed remotely (e.g., are "headless") and may not include a keyboard, etc.

Output device 340 may output information (e.g., to the operator or user). Output device 340 may include a display, a printer, a speaker, etc. For example, computer 224 may include display 126 that includes a liquid-crystal display (LCD) for displaying menus and content to the operator or user. Headless devices, such as switch 206, may be managed remotely and may not include a display, etc.

Input device 330 and output device 340 may allow the operator to activate and interact with a particular service or application, such as an application to manage TNs or edit information associated with subscribers and customers. Input device 330 and output device 340 may allow the subscriber to receive and view a menu of options and select from the menu options. The menu may allow the subscriber to select various functions or services associated with applications executed by computing module 300.

Communication interface 350 may include a transceiver that enables computing module 300 to communicate with other devices. Communication interface 350 in switch 206, for example, may include a number of switching modules to perform switching operations by interpreting dialed digits and connecting calls between telephones. Communication interface 350 may include a transmitter that, for example, converts baseband signals to radio frequency (RF) signals. Communication interface 350 may include a receiver that, for example, converts RF signals to baseband signals. Communication interface 350 may be coupled to an antenna for transmitting and receiving signals. Communication interface 350 may include a network interface card, e.g., an Ethernet or WiFi card, for wired or wireless communications.

Memory 360 may store, among other things, information and instructions (e.g., applications 364 and operating system (OS) 362) and data (e.g., application data 366) for use by processing logic 220. Memory 360 may include a random access memory (RAM) or another type of dynamic storage device, a read-only memory (ROM) device or another type of static storage device. Memory 360 may include a magnetic or optical recording medium and its corresponding drive (e.g., a hard disk drive).

OS 362 may include software instructions for managing hardware and software resources of computing module 300. For example, OS 362 may include Unix, Linux, OS X, Solaris, an embedded operating system, etc. Applications 364 and application data 366 may provide network services or include applications, depending on the device in which the particular computing module 300 is found. For example, controller 212 may include an application to manage TNs, customers, and subscribers.

Computing module 300 may perform the operations described herein in response to processing logic 220 executing software instructions contained in a non-transient computer-readable medium, such as memory 360. The software instructions may be read into memory 360 from another computer-readable medium or from another device via communication interface 350. The software instructions contained in memory 360 may cause processing logic 220 to perform processes that are described herein.

Figure 3B:
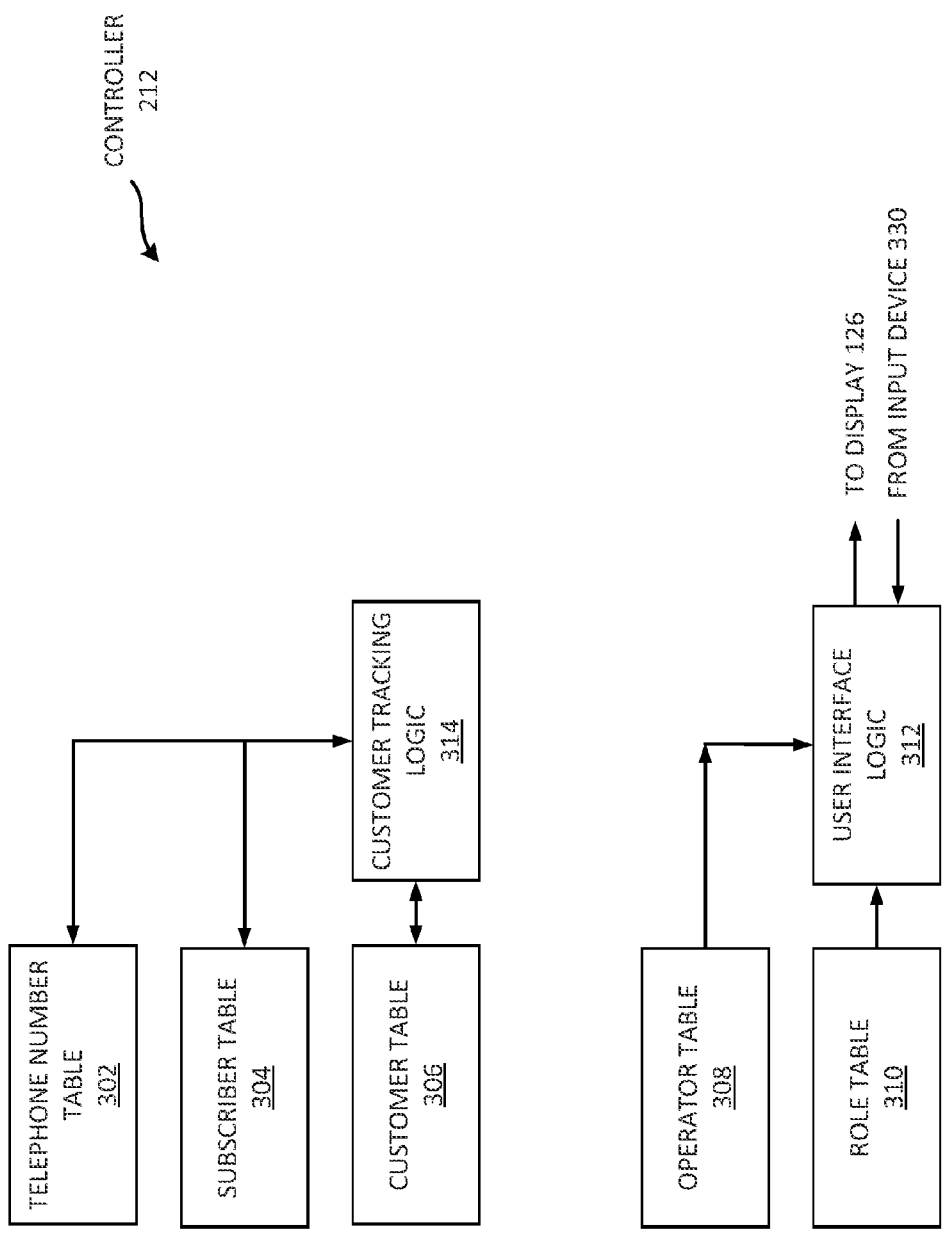
FIG. 3B is a block diagram of exemplary components of the controller of FIG. 1.

As discussed above, in one embodiment, controller 212 may control and handle blocks of TNs, information about subscribers, and information about customers. Controller 212 may also allow an operator to manage such information. FIG. 3B is a block diagram of exemplary components of controller 212 (e.g., functions performed by application 364 in processing logic 220 or stored in memory 360 of controller 212). Controller 212 may include a TN table 302, a subscriber table 304, a customer table 306, an operator table 308, a role table 310, user interface logic 312, and customer tracking logic 314. Some components shown in FIG. 3B may also be stored in other devices in network 200. For example, TN table 302 may also or alternatively be stored in switch 206. TN table 302, subscriber table 304, customer table 306, operator table 308, and role table 310 may each also be considered a "database." Further, tables 302, 304, 306, 308, and 310 may each be stored in a single database or different databases.

Figure 4B:

TN table 302 stores information related to telephone numbers, such as the subscriber associated with TNs and the status of the TNs. FIG. 4A is a diagram of an exemplary TN table 302-1. As used here, a "-1" suffix indicates one instance of TN table 302 or a snapshot of TN table 302 at a particular time. Other suffixes (e.g., "-2" or "-3") indicate other instances of TN table 302 or snapshots of TN table 302 at different times. For example, FIG. 4B shows TN table 302-2 (e.g., TN table 302 at a different point in time).

A record (e.g., an entry) 452-x in TN table 302-1 may associate a telephone number with a subscriber (e.g., an individual or a company) and may provide the status for the corresponding telephone number. As shown in FIG. 4A, TN table 302 may include a telephone number field 402, a status field 404, a subscriber field 408, and a history field 410. TN table 302 may include additional, different, or fewer fields than illustrated in FIG. 4A.

TN field 402 specifies a TN associated with the information stored in the other fields (e.g., fields 404-410). An exemplary value in TN field 404 is "2018917239" in record 452-1. While TN field 402 shows consecutive TNs in records 452-1 through 452-9, the numbers in TN table 302-1 do not have to be consecutive. For example, a TN may be removed from TN table 302-1 and returned to a national regulator in charge of distributing telephone numbers.

Status field 404 specifies the status (e.g., granted, free, available, allocated, working, etc.) A "granted" TN indicates a TN that has been granted to the carrier from a national regulator, for example, but is not yet available for a customer to use. After a TN has been granted to a carrier, information about that TN may be propagated to network switches of other carriers so that when the TN is called, the call will be routed to the correct carrier, for example. An "available" TN indicates a TN that is ready to be assigned or allocated to a customer. An "allocated" or "working" TN indicates a TN that has been assigned to a customer and, when called, rings a telephone, such as telephone 210-x.

Subscriber ID field 408 may include a value to identify (e.g., uniquely identify) a subscriber. TN table 302-1 specifies that some TNs are associated with the subscriber ID of 58625 (in bold); other TNs are associated with the subscriber ID of 58626 (not in bold); and yet other TNs are not yet associated with a subscriber ID (as indicated with a "-") (e.g., numbers that are not yet assigned or allocated).

History field 410 may store historical information about the corresponding TN. For example, history field 410 may store the periods of time during which the corresponding TN has been allocated, the customer associated with the TN, etc. As such, history field 410 may store previous customer information to which the TN was previously allocated.

As mentioned above, FIG. 4B shows TN table 302-2 (e.g., TN table 302 at a different point in time). In TN table 302-2, the subscriber ID associated with the TN of 2018917240 in record 452-2 has changed to 58628 (e.g., from 58625 as shown in TN table 302-1 in FIG. 3A).

Returning to FIG. 3B, subscriber table 304 may record information about subscribers that are identified in TN table 302 (e.g., stored in subscriber ID field 408). FIG. 5A is a diagram of an exemplary subscriber table 304 at one point in time (e.g., subscriber table 304-1). Subscriber table 304 stores information associated with subscriber IDs, such as names and addresses of the subscriber. Subscriber table 304 may include a subscriber ID field 502, a subscriber name field 504, a subscriber address field 506, and a subscriber type field 508.

Subscriber ID field 502 includes a value that identifies (e.g., uniquely) a subscriber. In one embodiment, a subscriber ID may be unique to the combination of a scriber name, address, and type. Subscriber name field 504 specifies the name of the subscriber. As shown in subscriber table 304-1, subscriber names include CBA Inc., FDE Inc., and GHI Inc., for example. Subscriber address field 506 specifies the address of the subscriber. Subscriber type field 508 specifies the type of subscriber, such as "business" or "personal."

Subscriber table 304 may include additional, fewer, or a different arrangement of fields than shown in FIG. 5A. For example, subscriber table 304 may include other information or contact information about a subscriber, such as a contact name of a person associated with a business subscriber ID.

Figure 5B:

In one embodiment, because the subscriber ID stored in ID field 502 is unique to the name, address, and type of subscriber, changing any of these values may generate a new subscriber ID for the new name, address, and type combination. For example, as shown in FIG. 5B, when CBA Inc. adds a new location at 760 First Street, Munich, Germany, a new subscriber ID is generated (e.g., 58628 as shown in subscriber table 304-2) with the new information. That is, a new subscriber ID is generated even though only an address has been added and the subscriber is the same entity or customer.

In one implementation, a wholesaler may supply some of the information stored in subscriber table 304. For example, controller 212 may include an application program interface (API) that allows a wholesaler to edit or add subscriber information stored in subscriber table 304. In this embodiment, the wholesaler may use a computer (such as computer 224) to input and/or change information. In another implementation, the network provider may supply some of the information stored in subscriber table 304.

Returning to FIG. 3B, customer table 306 stores information associated with customers, FIG. 6A is a diagram of an exemplary customer table 306 at one point in time (e.g., customer table 306-1). Customer table 306 may include a customer ID field 602, a customer name field 604, a customer address field 606, and customer subscriber ID field 608. Customer table 306 may include more, fewer, or a different arrangement of fields than shown in customer table 306.

Customer ID field 602 specifies a value that identifies (e.g., uniquely) a customer. A customer ID may be unique to a customer (e.g., an entity) regardless of its/his/her address (e.g., as compared to a subscriber ID). Customer name field 604 specifies the name of the customer. Customer address field 606 specifies the address, or one of the addresses, associated with the customer.

Subscriber ID field 608 specifies the subscriber IDs that are associated with the corresponding customer ID. For example, customer ID 2685 is associated with subscriber ID 58625 in customer table 306-1. A customer ID stored in field 602 may be associated with more than one subscriber. For example, as shown in customer table 306-1 in FIG. 6B, the customer ID of 2685 is associated with both subscriber ID 58625 and subscriber ID 58628. As shown in subscriber table 304-2 (FIG. 5B), these two subscribers (58625 and 58628) are associated with two different addresses.

In one embodiment, customer table 306-1 inherits customer name information and customer address information from subscriber table 304-1. For example, the name and address information associated with customer ID 2685 is the same as the name and address information associated with subscriber ID 58625.

Figure 7:
FIG. 7 is a diagram of an exemplary operator table stored in the controller of FIG. 3B.

Returning to FIG. 3B, operator table 308 stores information regarding operators (e.g., users). An operator may use computer 224 to access and edit information stored in subscriber table 304, customer table 306, etc. FIG. 7 is a diagram of an exemplary operator table 308. Operator table 308 includes an operator ID field 702, a country field 704, and a role field 706. The fields listed for operator table 308 are exemplary. Operator table 308 may include additional, fewer, or a different arrangement of fields.

Operator ID field 702 specifies the ID of an operator or user. For example, as shown in operator table 308, operator ID field includes the following IDs: Roger, Mary, John, and Sue, Country field 704 specifies countries for which the corresponding operator can administer TNs, subscriber information, or customer information in some way. For example, countries specified in field 704 include France, Germany, the United States, Singapore, Netherlands, United Kingdom, Australia, Switzerland, etc.

Role field 706 identifies the roles (e.g., groups of features) associated with the corresponding operator ID specified in field 702. A feature may include privileges to perform a function, such as editing, deleting, or updating information stored in TN table 302, subscriber table 304, customer table 306, etc. Exemplary roles specified in role field 706 include "number admin," "number operator," and "searcher." These features associated with these roles are described in more detail below.

Returning to FIG. 3B, feature table 310 stores information about the features, functions, or screens associated with different roles of operators. FIG. 8 is a diagram of an exemplary feature table 310. Feature table 310 includes a role field 802 and a feature field 804. Role field 802 specifies a role name and feature field 804 specifies the features (e.g., functions or "screens") associated with the role name. Role field 802 provides an easy way to group features and assign features to operators (e.g., using operator table 308). Examples of role names include "number operator," "searcher," "security admin," etc. Examples of features, described in more detail below, include add block, edit block, cancel block, search block, allocate, de-allocate, add reservation, edit reservation, cancel reservation, search reservations, add subscriber, search subscriber, cancel subscriber, edit subscriber, add customer, search customer; cancel customer, edit customer, initialize port-in, role administration, reports, add operator, and edit TN info. Other features not listed here are possible.

The feature "add block" allows for the operator to add a block of numbers (e.g., issued from a national regulator) to TN table 302. The number in a block, for example, may then be reserved or assigned to subscribers. The feature "edit block" allows the operator to edit the characteristics associated with the block of numbers, such as the name of the subscriber associated with the block. The feature "cancel block" allows the operator to remove the block of numbers from, for example, TN table 302. The feature "search block" allows the operator to search through or for blocks of numbers issued from the national regulator.

The feature "allocate" allows the operator to assign a TN to a subscriber. The act of allocation means that a call to the TN will ring a telephone associated with the subscriber. Further, the subscriber may place a call from a TN that has been allocated to it/him/her. The feature "de-allocate" allows the operator to reverse the allocation process.

The feature "add reservation" allows the operator to reserve one or more numbers for a subscriber or a reseller without necessarily allocating the numbers. For example, a range of TN's may be reserved for a reseller to sell to subscribers. Alternatively, a subscriber may reserve a range of TNs for future use (e.g., a university may reserve numbers for students). The feature "edit reservation" allows the operator to edit the characteristics associated with a reservation, such as the name of the wholesaler or subscriber associated with the range of TNs. The feature "cancel reservation" allows the operator to cancel or delete a reservation of TNs. The feature "search reservations" allows the operator to search information related to reservations.

The feature "add subscriber" allows the operator to add a subscriber, such as a subscriber listed in a record of subscriber table 304. The feature "search subscriber" allows the operator to search through subscriber table 304. The feature "cancel subscriber" allows the operator to cancel a subscriber (e.g., remove a subscriber from subscriber table 304). The feature "edit subscriber" allows an operator to edit the information associated with a subscriber, such as the address information in subscriber table 304.

The feature "add customer" allows the operator to add a customer, such as a customer listed in a record of customer table 306. The feature "search customer" allows the operator to search through customer table 306. The feature "cancel customer" allows the operator to cancel or delete a customer. The feature "edit customer" allows the operator to change information about a customer, such as the customer address.

The feature "initialize port-in" allows the operator to process TNs that are being ported to the carrier from another carrier. The feature "role administration" allows the operator to edit the features associated with roles (e.g., edit feature table 310). The feature "reports" allows the operator to run reports on information stored in TN table 302, for example. The feature "add operator" allows the operator to add or edit information stored in operator table 308, for example. The feature "edit TN info" allows the operator to edit some information related to TNs.

In one embodiment, a feature allows the operator to perform the function or feature for all the countries specified in country field 704. In another embodiment, functions or features themselves may be specified only for particular countries. For example, one feature may be specified and allowed to be used only for the United States. In this embodiment, only operators that specify the United States in country field 704 would be allowed to use the feature. In yet another embodiment, a country may be negatively specified for a particular feature. For example, one feature may be specified but not allowed for a particular country, such as the United States. In this embodiment, the feature may not be used by the operator for the negatively mentioned country even when the operator has privileges for that country as specified in country field 704.

Figure 9:
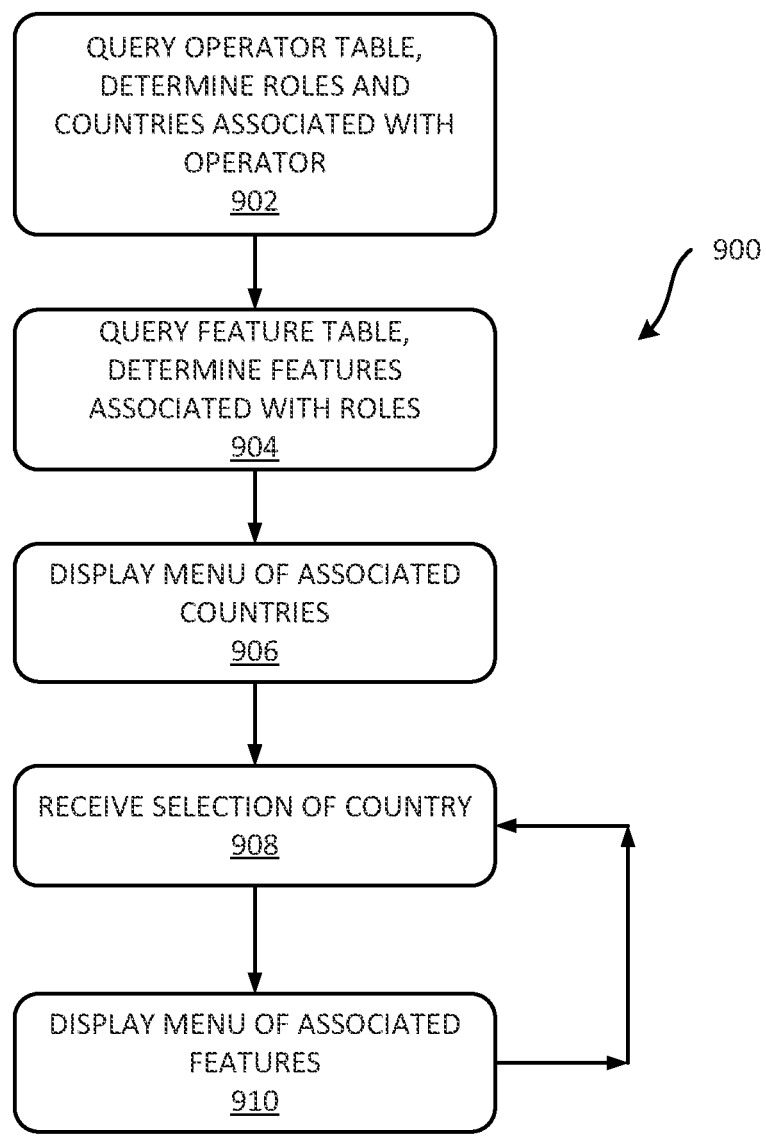
FIG. 9 is a flowchart of an exemplary process for displaying menus of features in a user interface in one embodiment.

Returning to FIG. 3B, user interface logic 312 receives operator table 308 and role table 310, and based on that information, outputs a menu of features to the operator on display 126. User interface logic 312 also inputs selections from the user via input device 330 and may respond accordingly. FIG. 9 is a flowchart of a process 900 for providing a user interface to an operator. Process 900 may be executed by user interface logic 312. Process 900 may begin after an operator uses computer 224 to log into controller 212 to access information stored in, for example, subscriber table 304 and/or customer table 306. Process 900 begins with the query of operator table 308 to determine the roles and countries associated with a particular operator (block 902). For example, assume that the operator associated with the operator ID of "Roger" is using computer 224 to log into controller 212. As indicated in operator table 308, the operator ID of "Roger" is associated with the countries of France, Germany, and the US. The operator ID of "Roger" is also associated with the following role: number admin.

Process 900 may continue with the query of feature table 310 to determine what features are associated with the role (block 904) determined at block 902. In the current example, the role of "number admin" (determined for Roger at block 902) is associated with the following features: add block, edit block, cancel block, search block, allocate, de-allocate, add reservation, edit reservation, cancel reservation, search reservations, add subscriber, search subscriber, cancel subscriber, edit subscriber, add customer, search customer, cancel customer, edit customer, and edit TN info.

Figure 10:
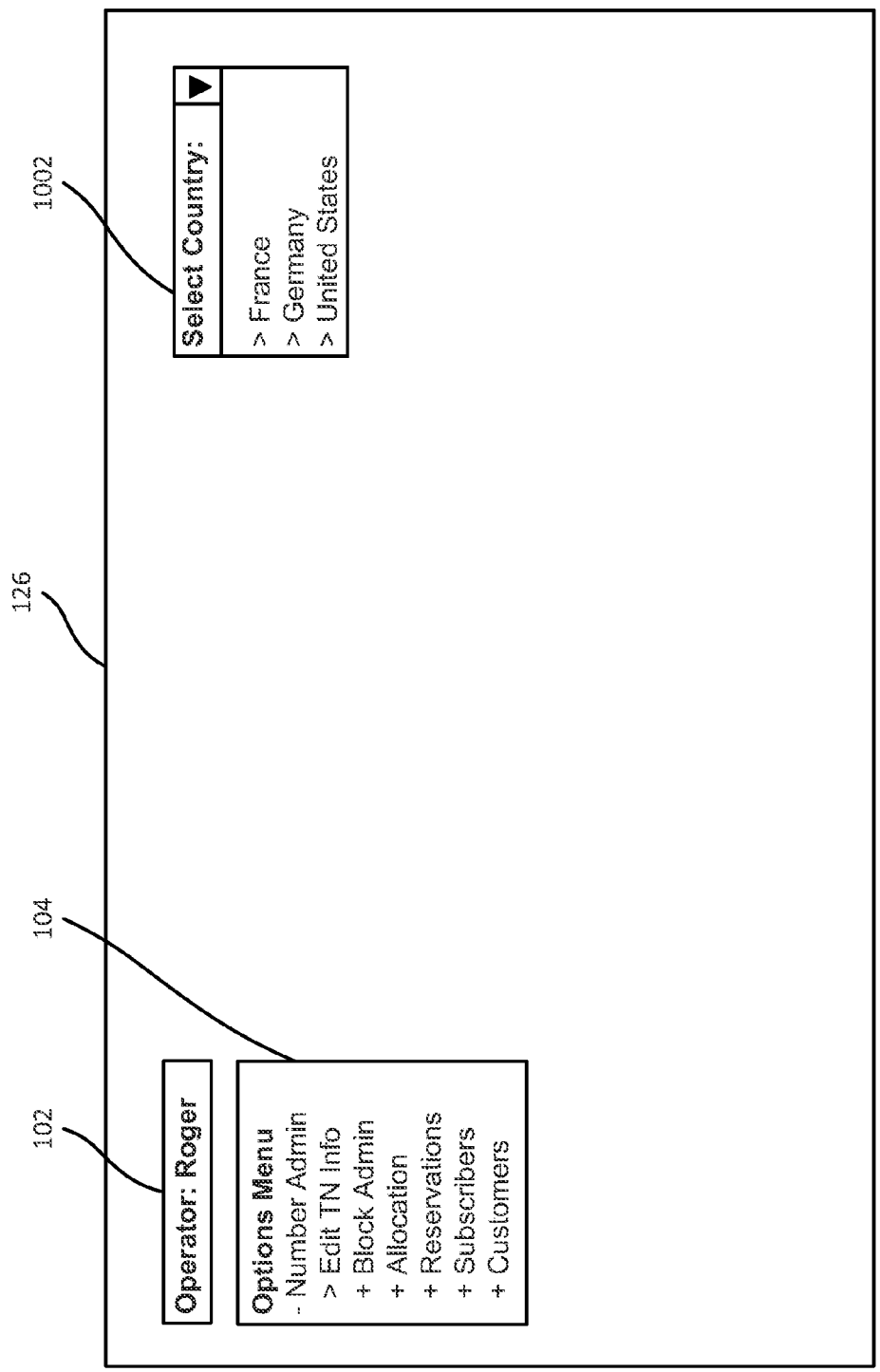
FIG. 10 is a diagram of an exemplary user interface according to one embodiment.

The operator may be presented with a list of the corresponding countries (block 906), as determined at block 902. For example, as shown in FIG. 10, a pull down menu 1002 displays the list of countries determined at block 902 (e.g., France, Germany, and United States). The operator may select one of the presented countries (block 908). In the current example, the operator (e.g., Roger) may select the country for which administration is desired, e.g., Germany. As shown in FIG. 1, box 110 displays "Germany" as the currently selected country for administration.

A menu of associated features may be displayed (block 910). As shown in FIG. 1, a dialog box 104 lists features (e.g., screens) that are associated with the roles associated with Roger. The features are listed with a ">" to the left to the feature. Some features may be grouped under headings, and the heading may include a "–" to the left of the heading. For example, box 104 lists Edit TN Info, Allocate, De-Allocate, Add (Subscriber), Search (Subscriber), Cancel (Subscriber), Edit (Subscriber), Add (Customer), Search (Customer), Cancel (Customer), and Edit (Customer). Some features may be hidden from view but grouped nonetheless by heading, and in this example the headings may include a "+" next to the heading. In one embodiment, the operator may click the heading "Reservations" to view the features of Add (Reservation), Search (Reservation), Cancel (Reservation), or Edit (Reservation).

As shown in FIG. 1, the operator has selected the feature "Edit TN Info" as indicated by highlighting box 104 surrounding the feature. As a result, Edit TN dialog box 106 (or screen) is displayed (e.g., for the country Germany). If the operator selected other features, then other dialog boxes or screens (not shown) would be displayed instead. Edit TN dialog box 106 provides the operator with the option of editing the TN, changing the status of the TN, changing the line type associated with the TN, changing the expiration date of the TN, changing the previous carrier ("losing carrier") associated with the TN, changing the current carrier ("gaining carrier" associated with the TN, or changing the subscriber ID associated with the TN-all for the country Germany.

Figure 11:
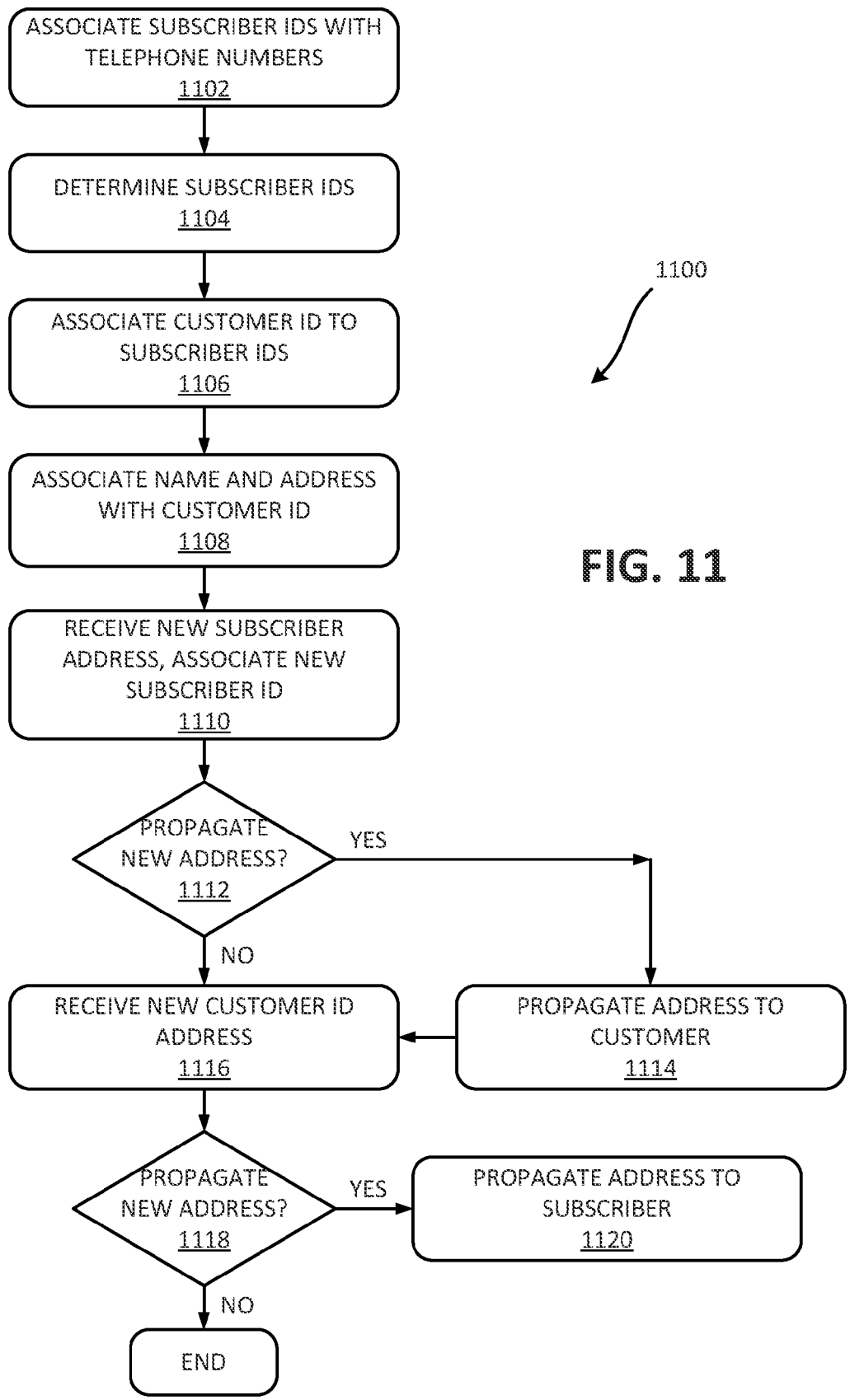
FIG. 11 is a flowchart of an exemplary process for tracking customers in one embodiment.

Returning to FIG. 3B, controller 212 may include customer tracking logic 314. Customer tracking logic 314 may input TN table 302, subscriber table 304, and customer table 306. Customer tracking logic 314 may update customer table 306 to track subscribers that are related to the same individual or entity, for example. FIG. 11 is a flowchart of a process 1100, which may be executed by customer tracking logic 314, for tracking customers and subscribers. Process 1000 associates customer IDs with subscriber IDs and subscriber IDs with TNs.

Process 1100 begins with the association of subscriber IDs with TNs (block 1102). As shown in FIG. 4A, each TN may be associated with a corresponding subscriber ID. The different subscriber IDs may be determined (block 1104). For example, as shown in TN table 302, records 452-1, 452-2, 452-5, and 452-8 are all associated with the same subscriber ID, e.g., 58625. A customer ID may be associated with each of the subscriber IDs (block 1106). For example, the subscriber ID 58625 may be associated with a customer ID, if a customer ID has not already been associated with the subscriber ID. In the current example, the customer ID of 2685 is associated with subscriber ID of 58625, as shown in FIG. 6A.

A name and address may be associated with the customer ID) (block 1108). In one embodiment, the customer ID may be associated with the same name and address as the address saved for the corresponding subscriber ID. That is, the customer ID may inherit the name and address of the underlying subscriber ID. In the current example, the customer ID of 2685 is associated with the name "CBA Inc." and with the address of 763 Main Street, Munich, Germany 52541 (e.g., the same name and address as the underlying subscriber ID).

In one implementation, a subscriber may change information associated with a TN. For example, the information associated with the TN in record 452-2 of TN table 302-1 may change. This change may be reflected in a different subscriber ID associated with the TN. For example, as shown in FIG. 4A, the TN of 2018917240 is associated with the subscriber ID of 58265. On the other hand, as shown TN table 302-2 in FIG. 4B, the same TN of 2018917240 is associated with the subscriber ID of 58268. This change may have been the result of a wholesaler changing the information associated with a TN (e.g., the subscriber name, subscriber address, or subscriber type). Nonetheless, although a subscriber ID has changed, the entity (e.g., customer) associated with the subscriber ID may not change. In the current example, the subscriber ID of 58628 is added to subscriber field 608 of customer table 306-2, thereby associating customer ID 2685 to the subscriber ID) of 58628. In one embodiment, the operator may be prompted to determine if the address associated with the customer ID (e.g., 2685) should also be updated to reflect the address change associated with the new subscriber ID. If the address is to be so propagated (block 1112: YES), then the address stored in address field 606 of customer table 306-2 may be updated (block 1114).

In one embodiment, art operator may change the address associated with a customer ID (block 1116). In this case, the operator may be prompted to determine whether the new address associated with the customer ID should be propagated to the subscriber ID (or subscriber IDs) that are indicated in field 608 of customer table 306 for the corresponding record. If so the new address is to be propagated (block 1118), then the address stored in fields 506 for the corresponding subscriber IDs may be updated to the new address received at block 1116.

In one embodiment, the operator may manually associated subscriber IDs with customers IDs. That is, the operator may add or remove subscriber IDs to or from subscriber ID field 608 of customer table 306. As described above, even when subscribers have relationships with a wholesaler, the network provider may easily track subscribers that relate to the same customer.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A computer-implemented method comprising:
   determining an operator identifier that identifies an operator of a telephone number management system;
   determining a list of countries associated with the operator identifier;
   determining a list of features associated with the operator identifier, wherein each feature allows the operator associated with the corresponding operator identifier to add, edit, or delete certain information in the telephone number management system associated with each of the countries in the list;
   displaying the list of countries and the list of features on a display;
   receiving a country selection by the operator associated with the operator identifier for a selected country in the list of countries;
   receiving a feature selection by the operator associated with the operator identifier for a selected feature in the list of features;
   receiving an instruction, from the operator associated with the operator identifier, to add, edit, or delete the certain information in the telephone number management system authorized by the selected feature and associated with the selected country.

2. The computer-implemented method of claim 1, further comprising:
   determining a role associated with the operator identifier, wherein determining the list of features associated with the operator identifier includes determining the list of features associated with the role.

3. The computer-implemented method of claim 1, further comprising:
   displaying a user interface, in response to the feature selection, associated with the feature selection.

4. The computer-implemented method of claim 1, wherein receiving the instruction to add, edit, or delete the certain information includes receiving an instruction to associate a subscriber identifier with a telephone number stored in the telephone number management system.

5. The computer-implemented method of claim 4, wherein receiving the instruction to add, edit, or delete the certain information includes receiving an instruction to associate a plurality of subscriber identifiers with a customer identifier.

6. A computer-implemented method comprising:
   storing a database including a plurality of subscriber identifiers, wherein each subscriber identifier is associated with a telephone number and a subscriber name and address, and wherein each subscriber identifier is unique to the corresponding subscriber name and address, wherein a first telephone number is associated with a first subscriber identifier, and a second telephone number, different than the first telephone number, is associated with the first subscriber identifier;
   storing a database including a plurality of customer identifiers, wherein each customer identifier is associated with a subscriber identifier and a customer name and address, and wherein at least one customer identifier is associated with two of the plurality of subscriber identifiers, wherein a first customer identifier is associated with the first subscriber identifier;
   receiving a first update to the subscriber name or address associated with the first telephone number and associating a new subscriber identifier with the first updated subscriber name or address in response to receiving the first update; and
   associating the new subscriber identifier with the first customer identifier and the first telephone number.

7. The computer-implemented method of claim 6, further comprising:
   updating the customer name and address associated with the first customer identifier based on the first update.

8. The computer-implemented method of claim 6, further comprising:
   receiving a second update to the customer name or address associated with the first customer identifier; and
   updating the subscriber name and address associated with the first subscriber identifier based on the second update.

9. The computer-implemented method of claim 8, further comprising:
   updating the subscriber name and address associated with the second subscriber identifier based on the second update.

10. The computer-implemented method of claim 9,
    storing a database of telephone numbers, wherein each telephone number is associated with one of the plurality of subscriber identifiers.

11. A system comprising:
    a database to store a plurality of operator identifiers, wherein each operator identifier identifies an operator of a telephone number management system and is associated with a list of countries and a list of features, wherein each feature allows the operator associated with the corresponding operator identifier to add, edit, or delete certain information in the telephone number management system associated with each of the countries in the list;
    a processor to determine one of the operator identifiers, the list of countries associated with the one of the operator identifiers, and the list of features associated with the one of the operator identifiers;
    a display to display the list of countries and the list of features on a display;
    a receiver to receive a country selection by the operator associated with the one of the operator identifiers for a selected country in the list of countries, and to receive a feature selection by the operator associated with the one of the operator identifiers for a selected feature in the list of features;
    wherein the receiver is configured to receive an instruction, from the operator associated with the one of the operator identifiers, to add, edit, or delete the certain information in the telephone number management system authorized by the selected feature and associated with the selected country.

12. The system of claim 11, further comprising:
determining a role associated with the one of the operator identifiers, wherein determining the list of features includes determining the list of features associated with the role.

13. The system of claim 11, further comprising:
displaying a user interface, in response to the feature selection, associated with the feature selection.

14. The system of claim 11, wherein receiving the instruction to add, edit, or delete the certain information includes receiving an instruction to associate a subscriber identifier with a telephone number stored in the telephone number management system.

15. The system of claim 14, wherein receiving the instruction to add, edit, or delete the certain information includes receiving an instruction to associate a plurality of subscriber identifiers with a customer identifier.

16. A system comprising:
a first database to store a plurality of subscriber identifiers, wherein each subscriber identifier is associated with a telephone number and a subscriber name and address, and wherein each subscriber identifier is unique to the corresponding subscriber name and address,
wherein a first telephone number is associated with a first subscriber identifier, and a second telephone number, different than the first telephone number, is associated with the first subscriber identifier;
a second database to store a plurality of customer identifiers, wherein each customer identifier is associated with a subscriber identifier and a customer name and address, and wherein at least one customer identifiers is associated with two of the plurality of subscriber identifiers, wherein a first customer identifier is associated with the first subscriber identifier;
a receiver to receive a first update to the subscriber name or address associated with the first subscriber identifier; and
a processor to associate a new subscriber identifier with the first updated subscriber name or address in response to receiving the first update, wherein the processor is configured to associate the new subscriber identifier with the first customer identifier and the first telephone number.

17. The system of claim 16, wherein the processor updates the customer name and address associated with the first customer identifier based on the first update.

18. The system of claim 16,
wherein the receiver is configured to receive a second update to the customer name or address associated with the first customer identifier; and
wherein the processor updates the subscriber name and address associated with the first subscriber identifier based on the second update.

19. The system of claim 18, wherein the processor updates the subscriber name and address associated with the second subscriber identifier based on the second update.

20. The system of claim 19, further comprising:
a third database to store telephone numbers, wherein each telephone number is associated with one of the plurality of subscriber identifiers.

* * * * *